(12) United States Patent
Derbeko et al.

(10) Patent No.: US 9,158,578 B1
(45) Date of Patent: Oct. 13, 2015

(54) SYSTEM AND METHOD FOR MIGRATING VIRTUAL MACHINES

(75) Inventors: Philip Derbeko, Modiin (IL); Assaf Natanzon, Tel Aviv (IL); Anat Eyal, Tel Aviv (IL); David Erel, Shoham (IL)

(73) Assignee: EMC Corporation, Hopkinton, MA (US)

( * ) Notice: Subject to any disclaimer, the term of this patent is extended or adjusted under 35 U.S.C. 154(b) by 412 days.

(21) Appl. No.: 13/539,398

(22) Filed: Jun. 30, 2012

Related U.S. Application Data

(63) Continuation-in-part of application No. 13/341,463, filed on Dec. 30, 2011.

(51) Int. Cl.
G06F 12/16 (2006.01)
G06F 9/48 (2006.01)
G06F 3/06 (2006.01)

(52) U.S. Cl.
CPC ............ *G06F 9/4856* (2013.01); *G06F 3/0631* (2013.01)

(58) Field of Classification Search
CPC .............................. G06F 9/4856; G06F 3/0631
See application file for complete search history.

(56) References Cited

U.S. PATENT DOCUMENTS

| | | |
|---|---|---|
| 5,687,390 A | 11/1997 | McMillan, Jr. |
| 5,835,928 A | 11/1998 | Auslander et al. |
| 5,887,146 A | 3/1999 | Baxter et al. |
| 6,119,209 A | 9/2000 | Bauman et al. |
| 6,157,991 A | 12/2000 | Arnon |
| 6,173,369 B1 | 1/2001 | Nguyen et al. |
| 6,434,681 B1 | 8/2002 | Armangau |
| 6,496,900 B1 | 12/2002 | McDonald et al. |
| 6,587,937 B1 | 7/2003 | Jensen et al. |
| 6,604,171 B1 | 8/2003 | Sade |
| 6,725,336 B2 | 4/2004 | Cherabuddi |
| 6,728,836 B1 | 4/2004 | Lambright et al. |
| 6,757,785 B2 | 6/2004 | Brutman et al. |
| 7,130,962 B2 | 10/2006 | Garney |
| 7,293,196 B2 | 11/2007 | Hicken et al. |
| 7,346,805 B1 | 3/2008 | Scharland et al. |
| 7,421,538 B2 | 9/2008 | Bita et al. |
| 7,574,538 B1 | 8/2009 | Yochai |
| 7,756,130 B1 | 7/2010 | Lee et al. |
| 7,761,680 B2 | 7/2010 | Ash et al. |
| 7,766,418 B2 | 8/2010 | Hemmersmeier |
| 7,769,951 B2 | 8/2010 | Lu et al. |
| 7,769,952 B2 | 8/2010 | Hashimoto et al. |
| 7,814,270 B2 | 10/2010 | Shimada |

(Continued)

*Primary Examiner* — Charles Rones
*Assistant Examiner* — Tian-Pong Chang
(74) *Attorney, Agent, or Firm* — Brian J. Colandreo; Mark H. Whittenberger; Holland & Knight LLP

(57) ABSTRACT

A method, computer program product, and computing system for receiving an indication that a target virtual machine is going to be migrated from a first operating environment to a second operating environment. The target cache system is associated with target virtual machine. An auxiliary virtual machine is generated within the second operating environment. An auxiliary cache system is associated with the auxiliary virtual machine. The target virtual machine and the auxiliary virtual machine are connected. IO requests for the target virtual machine are mirrored to the auxiliary virtual machine. At least a portion of cache data included within a target memory system associated with the target cache system is copied to an auxiliary memory system associated with the auxiliary cache system. The target virtual machine is migrated from the first operating environment to the second operating environment.

21 Claims, 5 Drawing Sheets

(56) References Cited

U.S. PATENT DOCUMENTS

| | | |
|---|---|---|
| 8,156,301 B1 | 4/2012 | Khandelwal et al. |
| 8,365,169 B1 * | 1/2013 | Watson et al. ............. 718/1 |
| 8,627,012 B1 | 1/2014 | Derbeko et al. |
| 8,930,947 B1 * | 1/2015 | Derbeko et al. ............ 718/1 |
| 2003/0070043 A1 | 4/2003 | Merkey |
| 2003/0084252 A1 | 5/2003 | Talagala |
| 2004/0059869 A1 | 3/2004 | Orsley |
| 2004/0064829 A1 | 4/2004 | Pallister et al. |
| 2004/0117441 A1 | 6/2004 | Liu |
| 2004/0205295 A1 | 10/2004 | O'Connor et al. |
| 2004/0267706 A1 | 12/2004 | Springer et al. |
| 2005/0071379 A1 | 3/2005 | Kekre et al. |
| 2005/0216536 A1 | 9/2005 | Stager et al. |
| 2006/0005189 A1 | 1/2006 | Vega et al. |
| 2006/0143383 A1 | 6/2006 | Zohar et al. |
| 2006/0143390 A1 | 6/2006 | Kottapalli |
| 2006/0168395 A1 | 7/2006 | Deng et al. |
| 2006/0179229 A1 | 8/2006 | Clark et al. |
| 2007/0050540 A1 | 3/2007 | Klein |
| 2007/0061511 A1 | 3/2007 | Faber |
| 2007/0168754 A1 | 7/2007 | Zohar et al. |
| 2007/0198612 A1 | 8/2007 | Prahlad et al. |
| 2007/0220207 A1 | 9/2007 | Black et al. |
| 2008/0098164 A1 | 4/2008 | Lee et al. |
| 2008/0215528 A1 | 9/2008 | Sedlar |
| 2008/0235457 A1 | 9/2008 | Hasenplaugh et al. |
| 2008/0294745 A1 | 11/2008 | Lowery et al. |
| 2008/0320209 A1 | 12/2008 | Lee et al. |
| 2009/0037680 A1 * | 2/2009 | Colbert et al. ............ 711/162 |
| 2009/0055591 A1 | 2/2009 | Miwa et al. |
| 2009/0113149 A1 | 4/2009 | Kondo et al. |
| 2009/0240880 A1 | 9/2009 | Kawaguchi |
| 2009/0313435 A1 | 12/2009 | Thantry et al. |
| 2010/0100696 A1 | 4/2010 | Suzuki |
| 2010/0228919 A1 | 9/2010 | Stabrawa et al. |
| 2010/0235580 A1 | 9/2010 | Bouvier |
| 2010/0250833 A1 | 9/2010 | Trika |
| 2011/0082980 A1 | 4/2011 | Gschwind et al. |
| 2011/0197039 A1 * | 8/2011 | Green et al. ............ 711/162 |
| 2011/0214033 A1 | 9/2011 | Yoshii et al. |
| 2011/0258393 A1 | 10/2011 | Flower et al. |
| 2011/0264845 A1 * | 10/2011 | Choi ............ 711/103 |
| 2012/0005468 A1 | 1/2012 | Yu et al. |
| 2012/0096460 A1 * | 4/2012 | Sekiguchi et al. ............ 718/1 |
| 2012/0173653 A1 * | 7/2012 | Bland et al. ............ 709/213 |
| 2012/0221785 A1 | 8/2012 | Chung et al. |
| 2012/0239860 A1 | 9/2012 | Atkisson et al. |
| 2012/0254131 A1 | 10/2012 | Al Kiswany et al. |
| 2012/0284234 A1 * | 11/2012 | Mashtizadeh et al. ....... 707/655 |
| 2012/0324443 A1 * | 12/2012 | Low et al. ............ 718/1 |
| 2013/0024920 A1 | 1/2013 | Rodriguez |
| 2013/0318051 A1 | 11/2013 | Kumar et al. |

* cited by examiner

SYSTEM AND METHOD FOR MIGRATING VIRTUAL MACHINES

RELATED APPLICATION(S)

This application is a continuation-in-part of U.S. patent application Ser. No. 13/341,463, entitled "System and Method for Improving Cache Performance", and filed on 30 Dec. 2011, the entirety of which is herein incorporated by reference.

TECHNICAL FIELD

This disclosure relates to cache memory systems and, more particularly, to systems and methods for improving the performance of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes receiving an indication that a target virtual machine is going to be migrated from a first operating environment to a second operating environment. The target cache system is associated with target virtual machine. An auxiliary virtual machine is generated within the second operating environment. An auxiliary cache system is associated with the auxiliary virtual machine. The target virtual machine and the auxiliary virtual machine are connected. IO requests for the target virtual machine are mirrored to the auxiliary virtual machine. At least a portion of cache data included within a target memory system associated with the target cache system is copied to an auxiliary memory system associated with the auxiliary cache system. The target virtual machine is migrated from the first operating environment to the second operating environment.

One or more of the following features may be included. Migrating the target virtual machine from the first operating environment to the second operating environment may include disconnecting the target virtual machine from the auxiliary virtual machine; disconnecting the target virtual machine from the target memory system; processing the IO requests that were mirrored from the target virtual machine to the auxiliary virtual machine and copying the remaining portion of the cache data included within a target memory system associated with the target cache system; and disconnecting the auxiliary virtual machine from the auxiliary memory system.

The target virtual machine may be attached to the auxiliary memory system. Normal operation of the target virtual machine may be resumed. Copying at least a portion of cache data may include copying at least 90% of the cache data included within the target memory system associated with the target cache system to the auxiliary memory system associated with the auxiliary cache system. One or more of the memory devices may be a flash memory device. The target virtual machine may be associated with a data array including one or more electro-mechanical storage devices.

In another implementation, a computer program product resides on a computer readable medium that has a plurality of instructions stored on it. When executed by a processor, the instructions cause the processor to perform operations including receiving an indication that a target virtual machine is going to be migrated from a first operating environment to a second operating environment. The target cache system is associated with target virtual machine. An auxiliary virtual machine is generated within the second operating environment. An auxiliary cache system is associated with the auxiliary virtual machine. The target virtual machine and the auxiliary virtual machine are connected. IO requests for the target virtual machine are mirrored to the auxiliary virtual machine. At least a portion of cache data included within a target memory system associated with the target cache system is copied to an auxiliary memory system associated with the auxiliary cache system. The target virtual machine is migrated from the first operating environment to the second operating environment.

One or more of the following features may be included. Migrating the target virtual machine from the first operating environment to the second operating environment may include disconnecting the target virtual machine from the auxiliary virtual machine; disconnecting the target virtual machine from the target memory system; processing the IO requests that were mirrored from the target virtual machine to the auxiliary virtual machine and copying the remaining portion of the cache data included within a target memory system associated with the target cache system; and disconnecting the auxiliary virtual machine from the auxiliary memory system.

The target virtual machine may be attached to the auxiliary memory system. Normal operation of the target virtual machine may be resumed. Copying at least a portion of cache data may include copying at least 90% of the cache data included within the target memory system associated with the target cache system to the auxiliary memory system associated with the auxiliary cache system. One or more of the memory devices may be a flash memory device. The target virtual machine may be associated with a data array including one or more electro-mechanical storage devices.

In another implementation, a computing system includes at least one processor and at least one memory architecture coupled with the at least one processor, wherein the computing system is configured to perform operations including receiving an indication that a target virtual machine is going to be migrated from a first operating environment to a second operating environment. The target cache system is associated with target virtual machine. An auxiliary virtual machine is generated within the second operating environment. An auxiliary cache system is associated with the auxiliary virtual machine. The target virtual machine and the auxiliary virtual machine are connected. IO requests for the target virtual machine are mirrored to the auxiliary virtual machine. At least a portion of cache data included within a target memory system associated with the target cache system is copied to an auxiliary memory system associated with the auxiliary cache system. The target virtual machine is migrated from the first operating environment to the second operating environment.

One or more of the following features may be included. Migrating the target virtual machine from the first operating environment to the second operating environment may include disconnecting the target virtual machine from the auxiliary virtual machine; disconnecting the target virtual machine from the target memory system; processing the IO requests that were mirrored from the target virtual machine to the auxiliary virtual machine and copying the remaining portion of the cache data included within a target memory system associated with the target cache system; and disconnecting the auxiliary virtual machine from the auxiliary memory system.

The target virtual machine may be attached to the auxiliary memory system. Normal operation of the target virtual machine may be resumed. Copying at least a portion of cache data may include copying at least 90% of the cache data included within the target memory system associated with the target cache system to the auxiliary memory system associated with the auxiliary cache system. One or more of the memory devices may be a flash memory device. The target virtual machine may be associated with a data array including one or more electro-mechanical storage devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
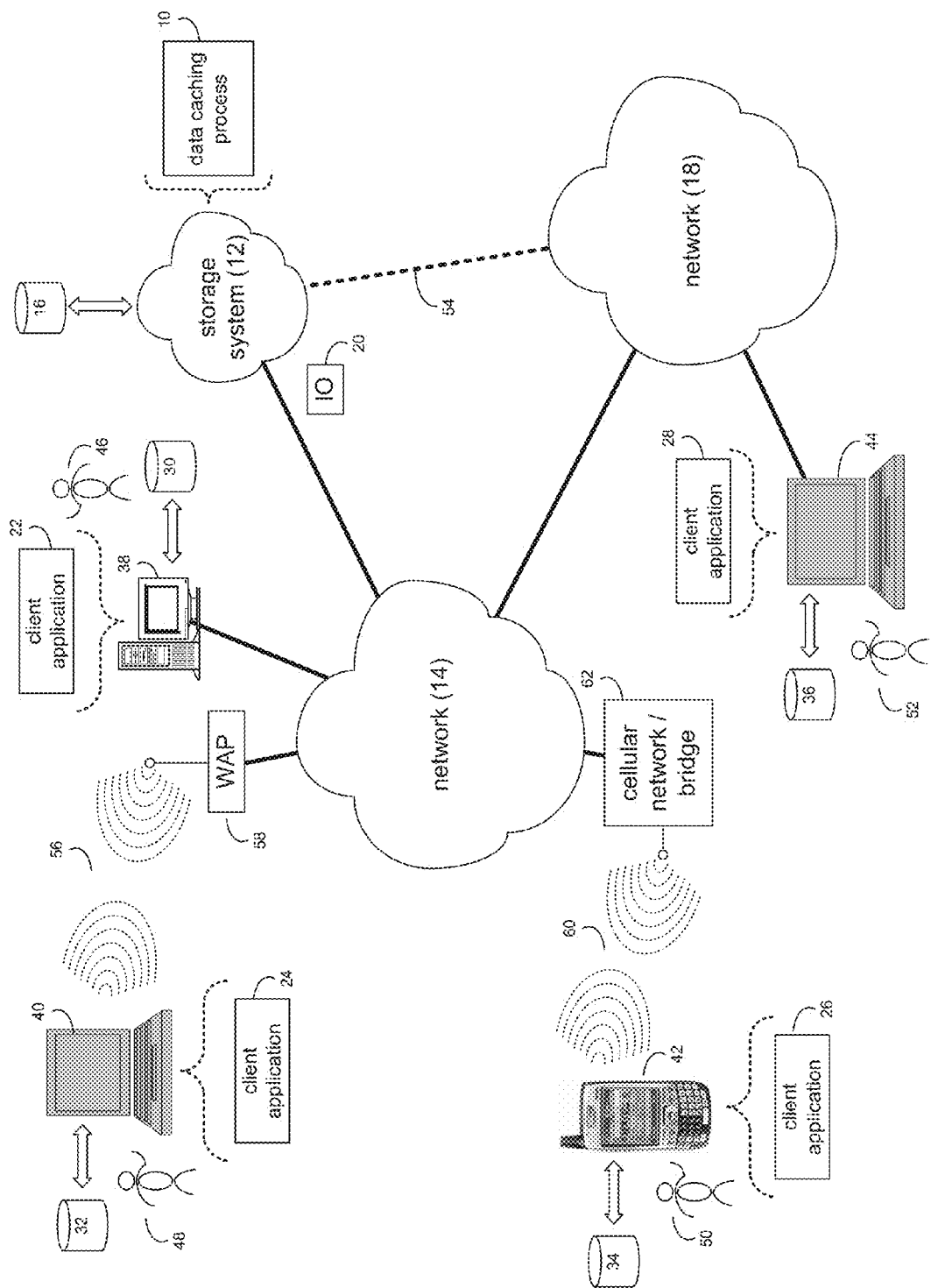
FIG. 1 is a diagrammatic view of a storage system and a VM migration process coupled to a distributed computing network.

System Overview:

Referring to FIG. 1, there is shown VM migration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™ Novell Netware™ Redhat Linux™, Unix, or a custom operating system, for example.

The instruction sets and subroutines of VM migration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

The Data Caching Process:

For the following discussion, client application 22 is going to be described for illustrative purposes. However, this is not intended to be a limitation of this disclosure, as other client applications (e.g., client applications 24, 26, 28) may be equally utilized.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
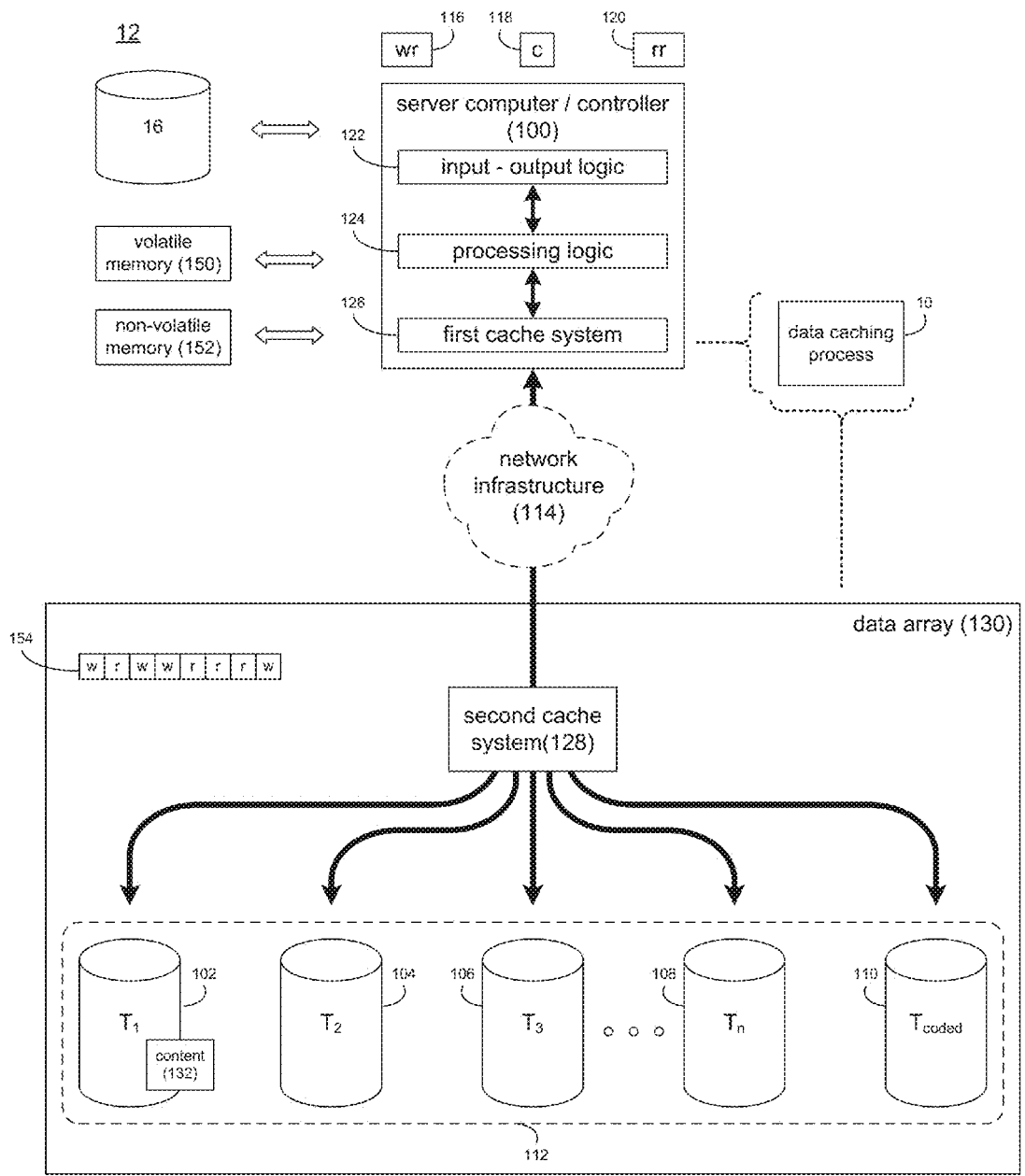
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of VM migration process 10. The instruction sets and subroutines of VM migration process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced. As will be described below in greater detail, first cache system 126 may be a content-aware cache system.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced. As will be described below in greater detail, second cache system 128 may be a content-aware cache system.

As discussed above, the instruction sets and subroutines of VM migration process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of VM migration process 10 may be executed by one or more processors (not shown) and one or more memory architectures (not shown) included within data array 130.

Virtual Machine Migration

Figure 3A:
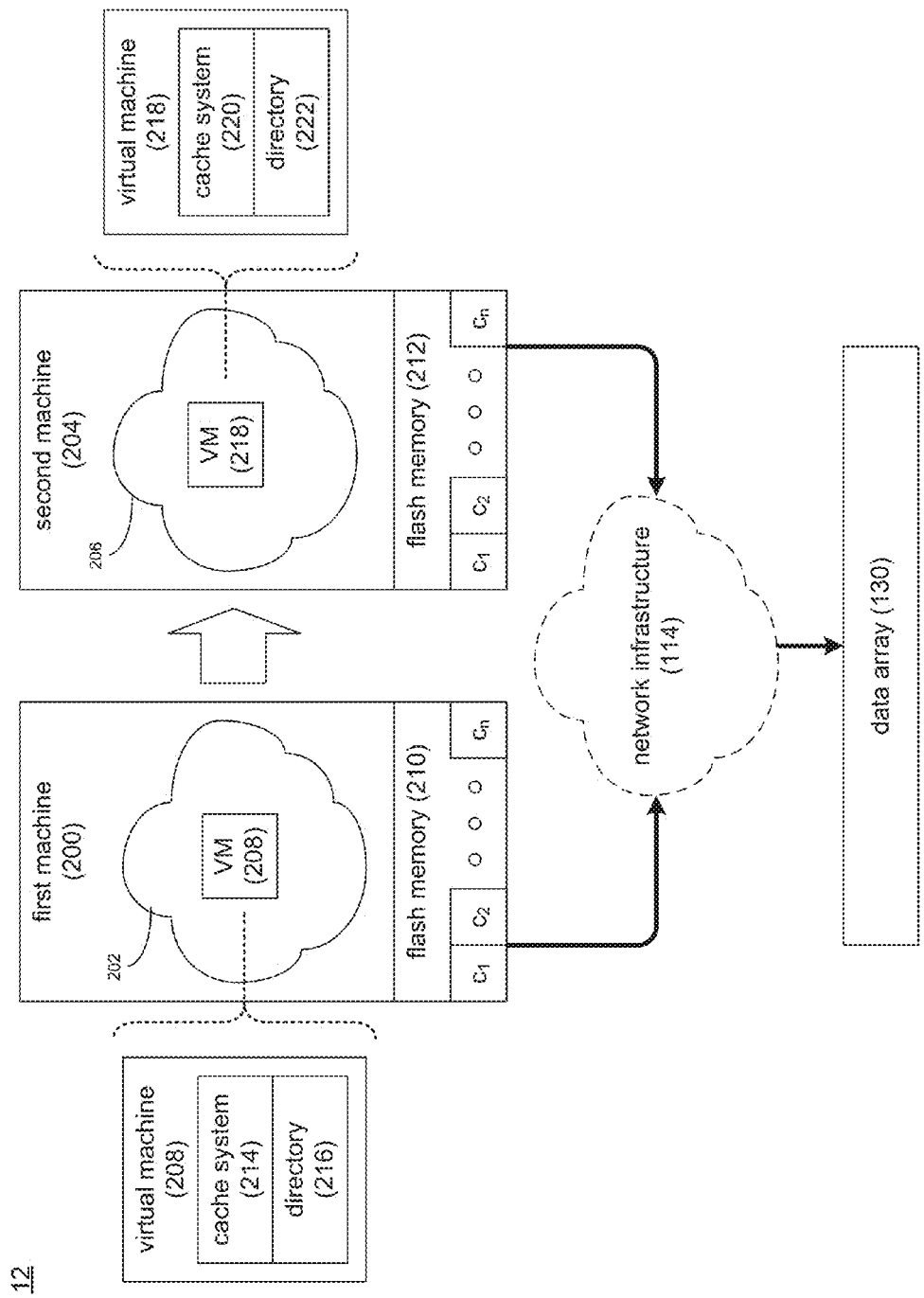
FIG. 3A is a diagrammatic view of an embodiment of the storage system of FIG. 1.
Figure 3B:
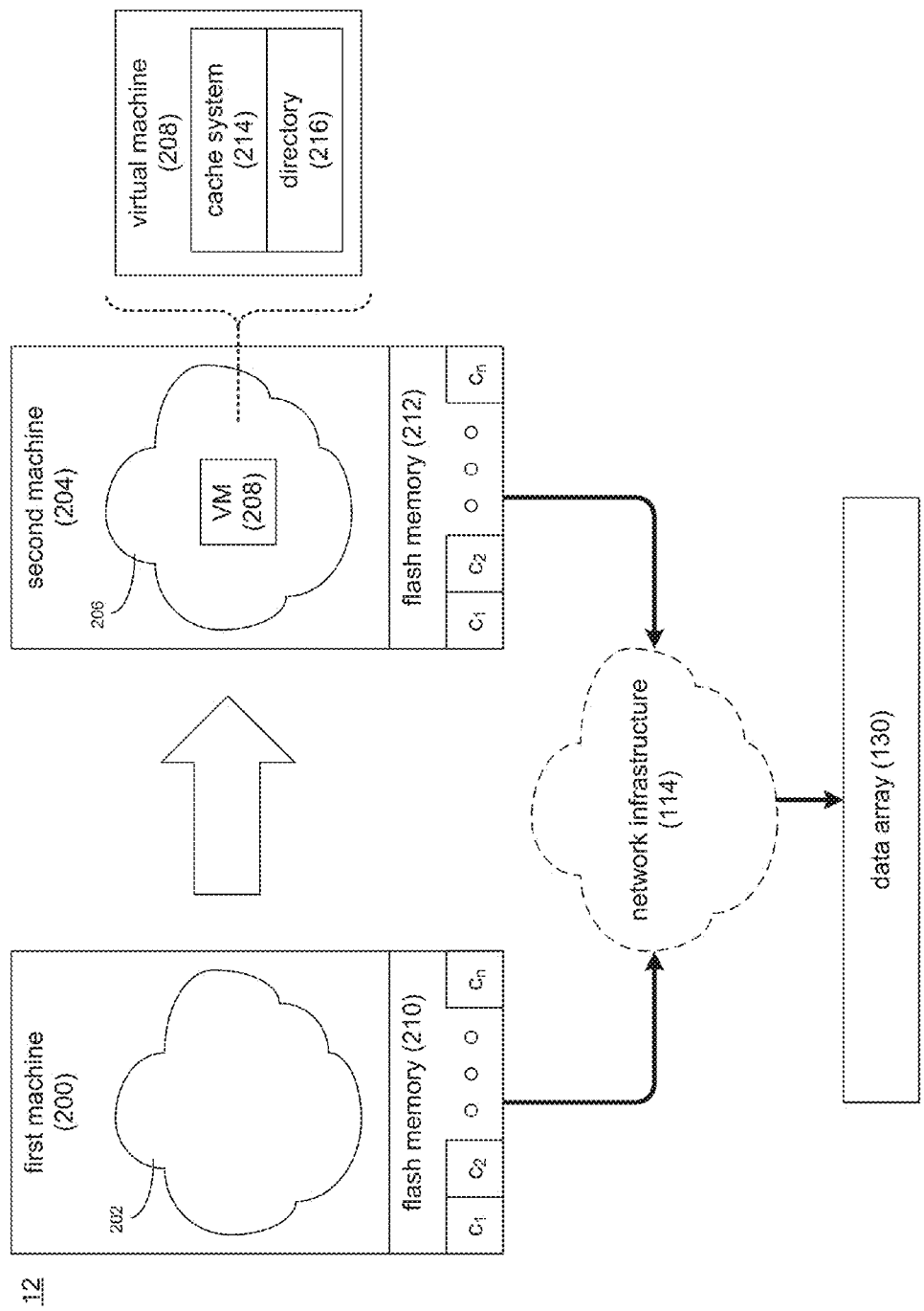
FIG. 3B is a diagrammatic view of an embodiment of the storage system of FIG. 1.

Referring also to FIGS. 3A-3B, assume for the following example that first server computer/controller 200 is a physical device that is executing first virtual machine operating environment 202. An example of such a virtual machine operating environment is a hypervisor, which is an instantiation of an operating system that allows for multiple virtual machines to operate within a single physical device (e.g., first server computer/controller 200). Further, second server computer/controller 204 is a physical device that is executing second virtual machine operating environment 206 (e.g., a hypervisor).

For this example, further assume that hypervisor 202 within first server computer/controller 200 is executing a virtual machine (e.g., target virtual machine 208, which is the "target" of the migration). While hypervisor 202 is shown to be executing only a single virtual machine, this is for illustrative purposes only and is not intended to be a limitation of this disclosure, as the number of virtual machines executed within hypervisor 202 may increase/decrease depending upon need/loading.

Assume further that first server computer/controller 200 and second server computer/controller 204 each includes a non-volatile memory system (e.g., flash memory devices 210, 212, respectively) that first server computer/controller 200 and second server computer/controller 204 may use for cache storage. Each of flash memory devices 210, 212 may be compartmentalized (e.g., into "n" portions, wherein a unique portion of flash memory device 210 may be assigned to each virtual machine running on hypervisor 202 and a unique portion of flash memory device 212 may be assigned to each virtual machine running on hypervisor 206.

Target virtual machine 208 may be associated with target cache system 214, which may include content directory 216. Accordingly, target virtual machine 208 may use target cache system 214, which may be implemented using flash memory device 210 (i.e., the target memory system). Content directory 216 may be configured to identify the location of specific pieces of content included within (in this example) flash memory device 210 and their corresponding pieces of data within data array 130.

Figure 4:
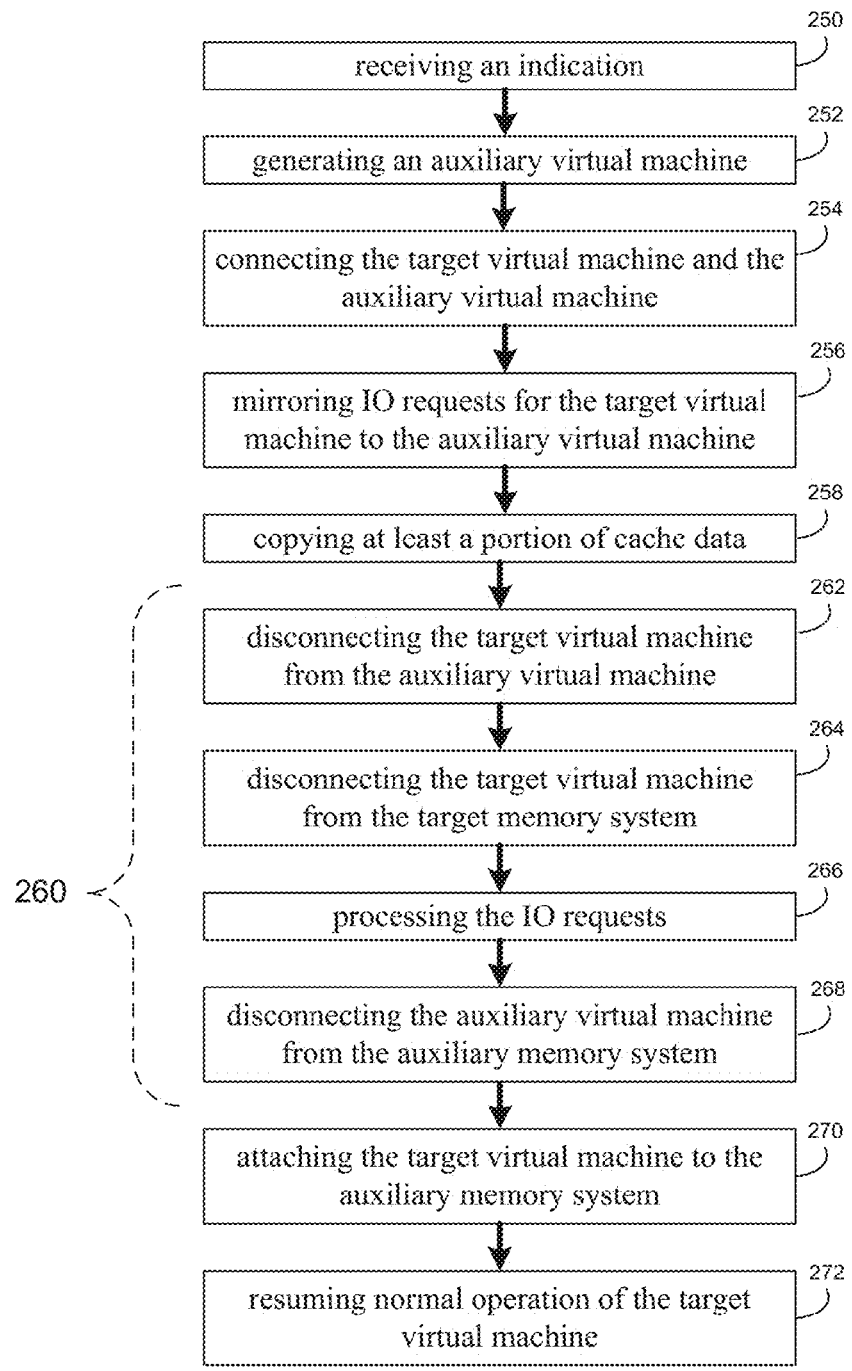
FIG. 4 is a flow chart of the VM migration process of FIG. 1.

Referring also to FIG. 4, assume that for some reason (e.g., maintenance/load balancing), VM migration process 10 receives 250 an indication, on target virtual machine 208, that target virtual machine 208 is going to be migrated. Specifically, through the use of products like VMware, virtual machines may be migrated (from a first physical device to a second physical device) without being shut down, (which is commonly referred to as a live migration or vmotion). Importantly, virtual machines typically cannot be migrated when the virtual machine is using/coupled to a physical storage device. Accordingly and in such a situation, the physical storage device will first need to be detached from the virtual machine before the virtual machine can be migrated.

Assume for illustrative purposes that the above-described indication concerns virtual machine 208 being migrated from hypervisor 202 running on first server computer/controller 200 to hypervisor 206 running on second server computer/controller 204. Specifically, FIG. 3A is intended to illustrate the system prior to the migration of virtual machine 208 to hypervisor 206 and FIG. 3B is intended to illustrate the system subsequent to the migration of virtual machine 208 to hypervisor 206. One or more of the above-described hypervisors (e.g., hypervisor 202 and/or hypervisor 206) may use one or more plug-ins/applets within the management framework of the hypervisor to allow for processing of the above-described indication notification and to effectuate the above-described migration.

Upon receiving 250 the above-described indication, VM migration process 10 may generate 252 an auxiliary virtual machine within the second operating environment. For example, VM migration process 10 may generate 252 auxiliary virtual machine 218 within second operating environment 206 and may associate auxiliary cache system 220 with auxiliary virtual machine 218. VM migration process 10 may connect 254 target virtual machine 208 and auxiliary virtual machine 218.

Once target virtual machine 208 and auxiliary virtual machine 218 are connected 254, VM migration process 10 may mirror 256 IO requests (e.g., IO request 20, FIG. 1) destined for target virtual machine 208 to auxiliary virtual machine 218. IO mirroring 256 may be synchronous or asynchronous, such as in the mirroring/replication process performed by EMC™ RecoverPoint™. Accordingly, if an IO request (e.g., IO request 20) was destined for target virtual machine 208, this IO request (e.g., IO request 20) will be processed by target virtual machine 208 and a copy of this IO request will also be provided to auxiliary virtual machine 218.

While the above-described IO request mirroring 256 is occurring, VM migration process 10 may copy 258 at least a portion of the cache data included within the target memory system (e.g., flash memory device 210) associated with target cache system 214 to an auxiliary memory system (e.g., flash memory device 212) associated with auxiliary cache system 220. For example, when VM migration process 10 is copying 258 at least a portion of the cache data, VM migration process 10 may copy at least 90% of the cache data included within the target memory system (e.g., flash memory device 210) associated with target cache system 214 to the auxiliary memory system (e.g., flash memory device 212) associated with auxiliary cache system 220.

Once the above-described copying 258 procedure is complete (e.g., 90% of the data within the cache was copied), VM migration process 10 may migrate 260 target virtual machine 208 from first operating environment 202 to second operating environment 206. Migrating 260 target virtual machine 208 from first operating environment 202 to second operating environment 206 may include the execution of various processes.

For example, VM migration process 10 may downgrade the mode of operation of cache system 214 within virtual machine 208. The manner in which VM migration process 10 may downgrade the mode of operation of cache system 214 may vary depending on the manner in which VM migration process 10 is implemented.

For example and upon completion of the above-described copying procedure 258, VM migration process 10 may downgrade the operation of cache system 214 as follows: a) for read requests that result in cache hits, cache system 214 may obtain the requested content from the appropriate portion of flash memory device 210 that is associated with cache system 214 (or may obtain the requested content from data array 130); b) for read requests that result in cache misses, cache system 214 may obtain the requested content from data array 130 (but the obtained content will not be copied into flash memory device 210); and c) for write requests, the provided content may be written to data array 130 (but the provided content will not be copied into flash memory device 210), wherein the production write will invalidate cache if write is to a location already in cache.

Once VM migration process 10 downgrades the operation of cache system 214, VM migration process 10 may disconnect 262 target virtual machine 208 from auxiliary virtual machine 218 and disconnect 264 target virtual machine 208 from the target memory system (e.g., flash memory device 210).

VM migration process 10 may also process 266 some or all of the IO requests that were mirrored from target virtual machine 208 to auxiliary virtual machine 218, and copy the cache entries that were not synchronized at step 258 (i.e. the last 10% of the data to auxiliary machine 218) and disconnect 268 auxiliary virtual machine 218 from the auxiliary memory system (e.g., flash memory device 212).

Specifically and during the above-described mirroring process, target virtual machine 208 was processing the received IO requests (that were also being mirrored 256 by VM migration process 10 to auxiliary virtual machine 218. Accordingly and up until the point that VM migration process 10 downgrades the operation of cache system 214, the data included within cache system 214 was being updated based upon the IO requests received and processed by target virtual machine 208. However, after VM migration process 10 downgraded the operation of cache system 214, the data included within cache system 214 was no longer being updated based upon the IO requests received and processed by target virtual machine 208. Accordingly and for such IO requests received after VM migration process 10 downgrades the operation of cache system 214, there will be a mismatch between the data included within data array 130 and the data included within cache system 214. Accordingly, when VM migration process 10 processes 266 some of the IO requests that were mirrored from target virtual machine 208 to auxiliary virtual machine 218, VM migration process 10 may process those IO requests that were mirrored from target virtual machine 208 to auxiliary virtual machine 218 after VM migration process 10 downgraded the operation of cache system 214. Specifically, any corresponding cache entry (within cache directory 222 associated with auxiliary cache system 220) may be invalidated by VM migration process 10.

Continuing with the above-stated example, once VM migration process 10 disconnects 268 auxiliary virtual machine 218 from the auxiliary memory system (e.g., flash memory device 212), VM migration process 10 may migrate virtual machine 208 from hypervisor 202 to hypervisor 206. As discussed above, through the use of products like VMware, virtual machine 208 may be migrated from hypervisor 202 to hypervisor 206 without being shut down, which is commonly referred to as a live migration or vmotion. Once VM migration process 10 migrates virtual machine 208 from hypervisor 202 to hypervisor 206 (resulting in the system being configured in the manner shown in FIG. 3B), VM migration process 10 may attach 270 newly-migrated target virtual machine 208 to the auxiliary memory system (e.g., flash memory device 212) and VM migration process 10 may resume 272 normal operation of target virtual machine 208.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving an indication that a target virtual machine is going to be migrated from a first operating environment to a second operating environment, wherein a target cache system is associated with the target virtual machine;
   generating an auxiliary virtual machine within the second operating environment, wherein an auxiliary cache system is associated with the auxiliary virtual machine;
   connecting the target virtual machine and the auxiliary virtual machine;
   mirroring IO command requests for the target virtual machine to the auxiliary virtual machine;
   copying at least a portion of cache data included within a target memory system associated with the target cache system to an auxiliary memory system associated with the auxiliary cache system;
   disconnecting the target virtual machine from the auxiliary virtual machine;
   processing the IO command requests that were mirrored from the target virtual machine to the auxiliary virtual machine; and
   migrating the target virtual machine from the first operating environment to the second operating environment including downgrading a mode of operation of the target cache system including, for a received write request, writing content associated with the received write request directly to a data array associated with the target virtual machine without writing the content associated with the received write request to the target memory system.

2. The computer-implemented method of claim 1 wherein migrating the target virtual machine from the first operating environment to the second operating environment includes:
   disconnecting the target virtual machine from the target memory system;

copying the remaining portion of the cache data included within a target memory system associated with the target cache system; and disconnecting the auxiliary virtual machine from the auxiliary memory system.

3. The computer-implemented method of claim 2 further comprising:

attaching the target virtual machine to the auxiliary memory system.

4. The computer-implemented method of claim 3 further comprising:

resuming normal operation of the target virtual machine.

5. The computer-implemented method of claim 1 wherein copying at least a portion of cache data includes:

copying at least 90% of the cache data included within the target memory system associated with the target cache system to the auxiliary memory system associated with the auxiliary cache system.

6. The computer-implemented method of claim 1 wherein one or more of the target memory system and the auxiliary memory system is a flash memory device.

7. The computer-implemented method of claim 1 wherein the data array includes one or more electro-mechanical storage devices.

8. A computer program product residing on a non-transitory computer readable medium having a plurality of instructions stored thereon which, when executed by a processor, cause the processor to perform operations comprising:

receiving an indication that a target virtual machine is going to be migrated from a first operating environment to a second operating environment, wherein a target cache system is associated with the target virtual machine;

generating an auxiliary virtual machine within the second operating environment, wherein an auxiliary cache system is associated with the auxiliary virtual machine;

connecting the target virtual machine and the auxiliary virtual machine;

mirroring IO command requests for the target virtual machine to the auxiliary virtual machine;

copying at least a portion of cache data included within a target memory system associated with the target cache system to an auxiliary memory system associated with the auxiliary cache system;

disconnecting the target virtual machine from the auxiliary virtual machine;

processing the IO command requests that were mirrored from the target virtual machine to the auxiliary virtual machine; and migrating the target virtual machine from the first operating environment to the second operating environment including downgrading a mode of operation of the target cache system including, for a received write request, writing content associated with the received write request directly to a data array associated with the target virtual machine without writing the content associated with the received write request to the target memory system.

9. The computer program product of claim 8 wherein the instructions for migrating the target virtual machine from the first operating environment to the second operating environment include instructions for:

disconnecting the target virtual machine from the target memory system;

copying the remaining portion of the cache data included within a target memory system associated with the target cache system; and disconnecting the auxiliary virtual machine from the auxiliary memory system.

10. The computer program product of claim 9 further comprising instructions for:

attaching the target virtual machine to the auxiliary memory system.

11. The computer program product of claim 10 further comprising instructions for:

resuming normal operation of the target virtual machine.

12. The computer program product of claim 8 wherein the instructions for copying at least a portion of cache data include instructions for:

copying at least 90% of the cache data included within the target memory system associated with the target cache system to the auxiliary memory system associated with the auxiliary cache system.

13. The computer program product of claim 8 wherein one or more of the target memory system and the auxiliary memory system is a flash memory device.

14. The computer program product of claim 8 wherein the data array includes one or more electro-mechanical storage devices.

15. A computing system including at least one processor and at least one memory architecture coupled with the at least one processor, wherein the computing system is configured to perform operations comprising:

receiving an indication that a target virtual machine is going to be migrated from a first operating environment to a second operating environment, wherein a target cache system is associated with the target virtual machine;

generating an auxiliary virtual machine within the second operating environment, wherein an auxiliary cache system is associated with the auxiliary virtual machine;

connecting the target virtual machine and the auxiliary virtual machine;

mirroring IO command requests for the target virtual machine to the auxiliary virtual machine;

copying at least a portion of cache data included within a target memory system associated with the target cache system to an auxiliary memory system associated with the auxiliary cache system;

disconnecting the target virtual machine from the auxiliary virtual machine;

processing the IO command requests that were mirrored from the target virtual machine to the auxiliary virtual machine; and migrating the target virtual machine from the first operating environment to the second operating environment including downgrading a mode of operation of the target cache system including, for a received write request, writing content associated with the received write request directly to a data array associated with the target virtual machine without writing the content associated with the received write request to the target memory system.

16. The computing system of claim 15 wherein migrating the target virtual machine from the first operating environment to the second operating environment includes:

disconnecting the target virtual machine from the target memory system;

copying the remaining portion of the cache data included within a target memory system associated with the target cache system; and disconnecting the auxiliary virtual machine from the auxiliary memory system.

17. The computing system of claim 16 further configured to perform operations comprising:
   attaching the target virtual machine to the auxiliary memory system.

18. The computing system of claim 17 further configured to perform operations comprising:
   resuming normal operation of the target virtual machine.

19. The computing system of claim 15 wherein copying at least a portion of cache data includes:
   copying at least 90% of the cache data included within the target memory system associated with the target cache system to the auxiliary memory system associated with the auxiliary cache system.

20. The computing system of claim 15 wherein one or more of the target memory system and the auxiliary memory system is a flash memory device.

21. The computing system of claim 15 wherein the data array includes one or more electro-mechanical storage devices.

* * * * *